UNITED STATES PATENT OFFICE.

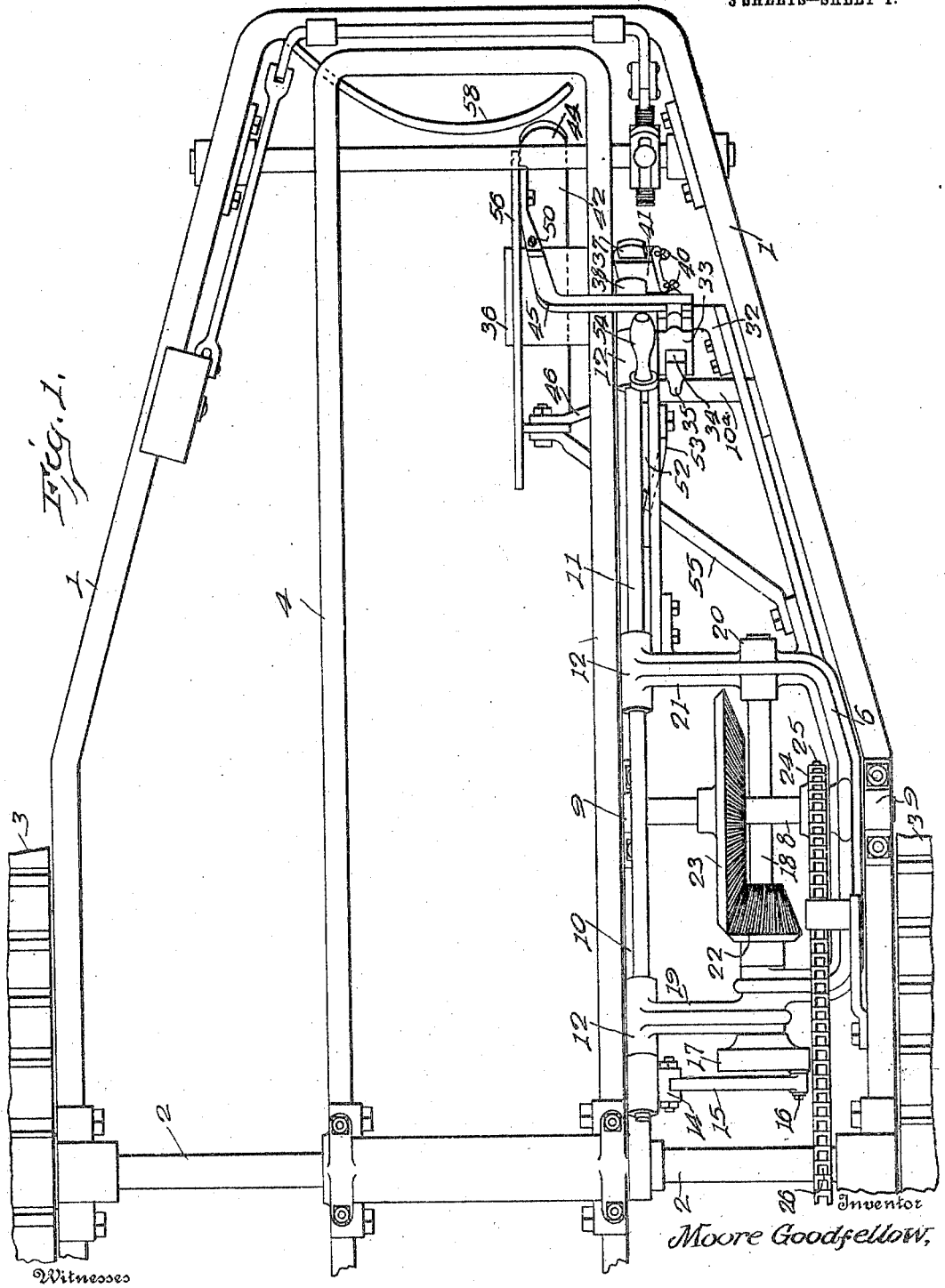

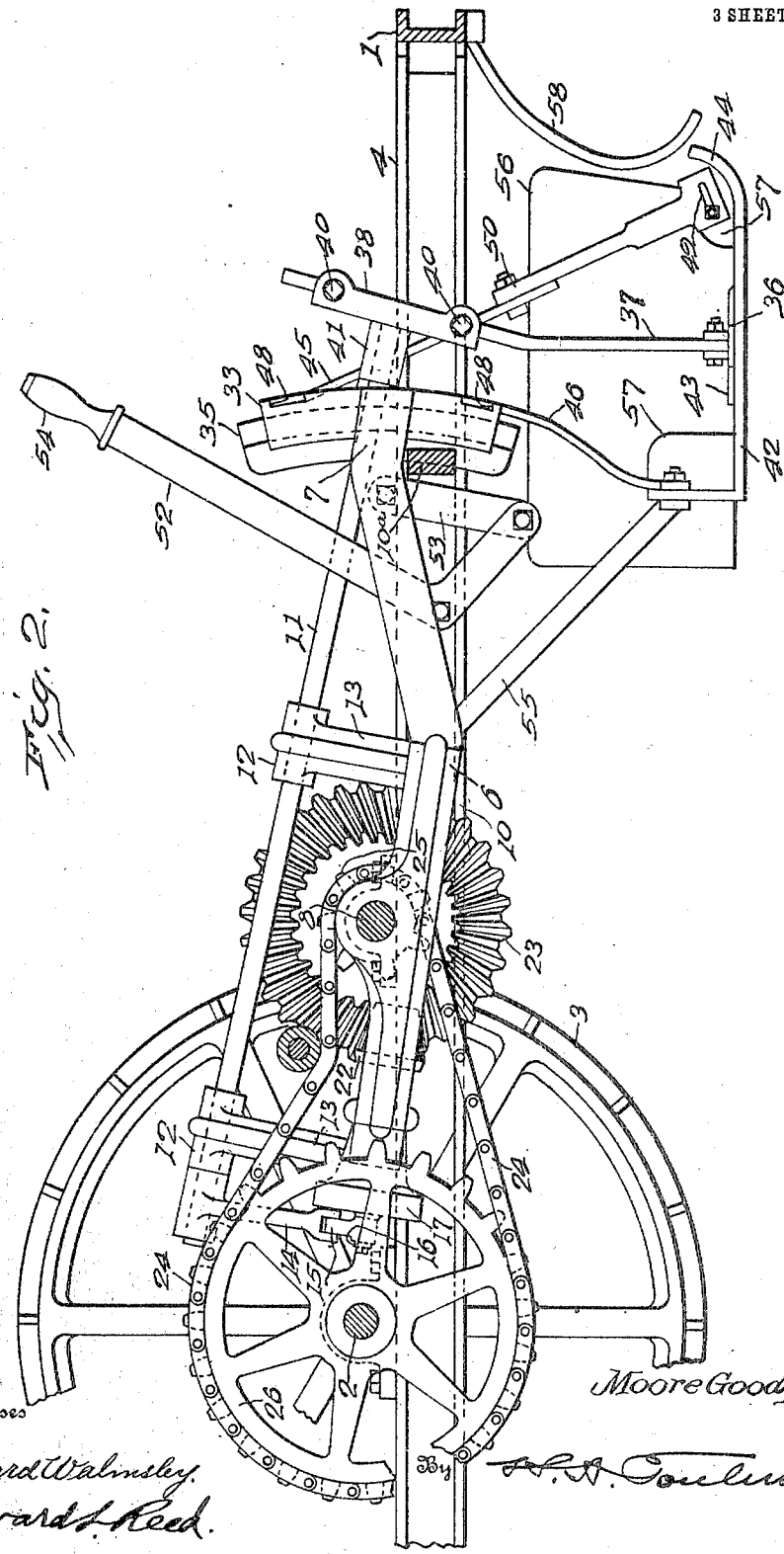

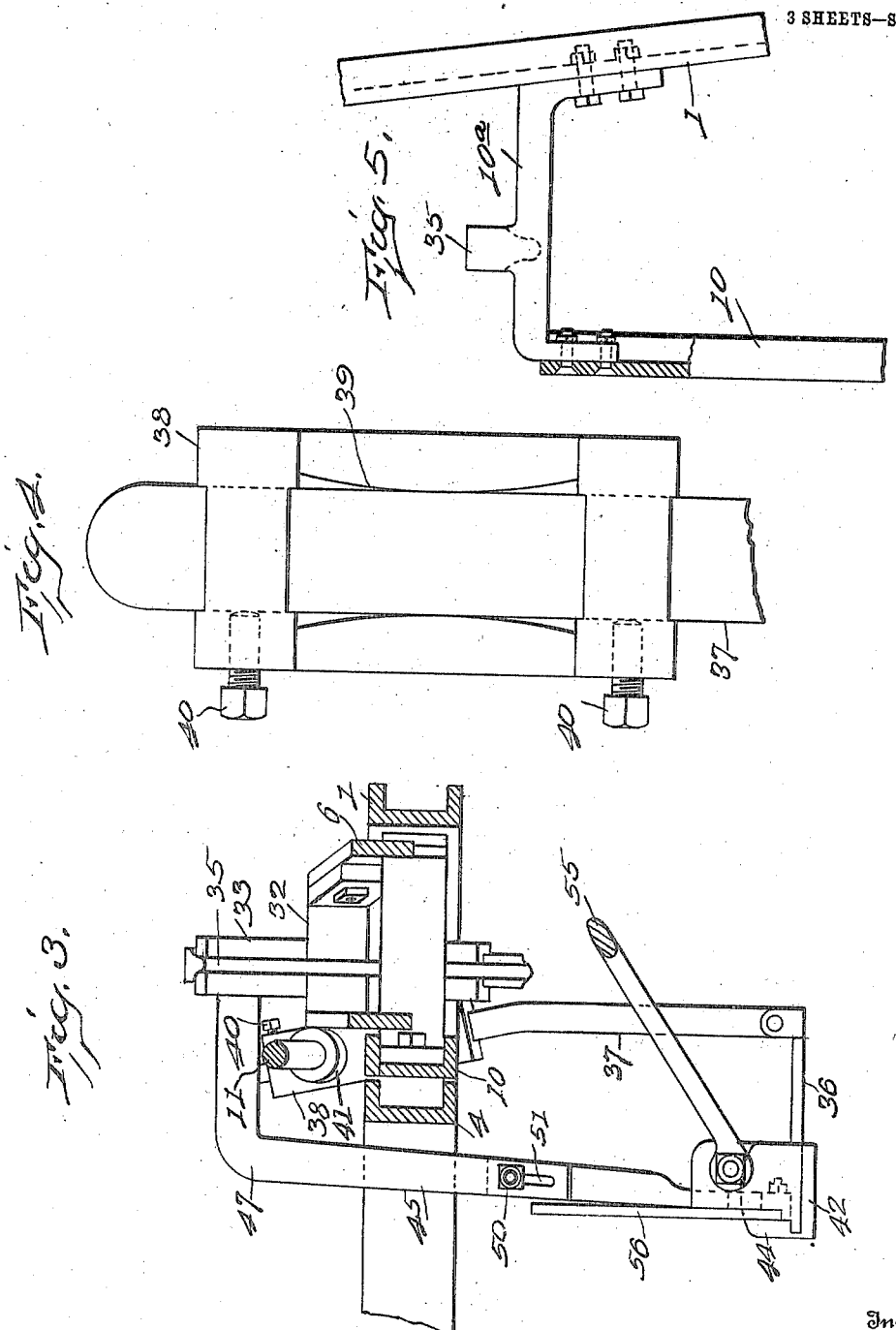

MOORE GOODFELLOW, OF COLUMBUS, OHIO, ASSIGNOR OF ONE-HALF TO JOSEPH O. DYE, OF COLUMBUS, OHIO; JOSEPH O. DYE ADMINISTRATOR OF SAID GOODFELLOW, DECEASED.

BEET-TOPPER.

950,909.

Specification of Letters Patent. Patented Mar. 1, 1910.

Application filed November 1, 1907. Serial No. 400,291.

*To all whom it may concern:*

Be it known that I, MOORE GOODFELLOW, a citizen of the United States, residing at Columbus, in the county of Franklin and State of Ohio, have invented certain new and useful Improvements in Beet-Toppers, of which the following is a specification, reference being had therein to the accompanying drawings.

This invention relates to beet toppers and is designed more particularly for use in connection with beet harvesting machines.

Sugar beets when ready for the harvest usually protrude some distance above the surface of the ground, and it is necessary before the beets can be properly harvested by machinery to remove the tops or foilage from the protruding portions of the beets. The beets do not all protrude from the ground the same distance, and consequently, in order to properly top the beets without cutting into the body portion thereof, it is necessary to provide mechanism which can be readily adjusted to different levels to top beets of different heights. In many of the beet toppers heretofore constructed, it has been customary to support the cutter upon a shoe or guide of some sort which was arranged immediately above the beet row and was adapted to engage the beet itself to bring the cutter to the proper level to sever the top from the beet. But this shoe or supporting mechanism necessarily projected such a distance in the rear of the cutter that it was impossible to move the cutting edge thereof from a higher to a lower level until this edge had moved for some distance beyond the beet just topped, and where a low beet followed just beyond and close to a high beet it was practically impossible, with a machine of this character, to top the low beet, for the reasons above mentioned.

The object of this invention is to provide a topper which will be so constructed that it may be readily dropped from a high to a low level at a point immediately beyond the high beet, thereby enabling a low beet growing close to a high beet and beyond the same to be properly topped; and to this end, it is a further object of my invention to so construct the supporting mechanism for the cutter that the cutter itself will be the only portion of the apparatus which will lie above the beet row, and to so mount this supporting mechanism and the cutter that the entire mechanism can be readily adjusted in a vertical plane.

With these and other objects in view my invention consists in certain novel features of construction and in certain parts and combinations hereinafter to be described, and then more particularly pointed out in the claims.

In the accompanying drawings, Figure 1 is a top plan view of a beet harvester equipped with my improved topper; Fig. 2 is a side elevation of the same with the outer member of the main frame broken away; Fig. 3 is a transverse sectional view, taken in the rear of the topper and looking forward; Fig. 4 is a detail view of the supporting bracket for the shank of the cutter; and Fig. 5 is a detail view of the supporting bracket for the guide plate.

In these drawings I have illustrated my invention as embodied in a harvester of known construction and comprising a main frame 1 supported at one end upon a driving axle 2 having suitable traction wheels 3. It will be obvious that the invention can be readily adapted to beet harvesters of different construction. As here shown, the cutter blade and the supporting mechanism therefor are adjustably mounted within the main frame, and, to this end I have provided a supplemental or carrier frame 6 mounted within the main frame and having its outer side member inclined toward the inner side member to conform the frame to the contour of the main frame. The forward end of the supplemental frame is preferably inclined upwardly to a point above the main frame, as shown at 7. This frame is pivotally mounted upon a shaft 8 by means of suitable bearings secured to the frame members. This shaft 8 is, in turn, journaled in suitable bearings 9 carried by the outer side member of the main frame 1 and a suitable fixed part of the main frame located at some point within said side member thereof. This inner member as herein shown consists of a beam or bar 10 extending substantially parallel with the length of the main frame and preferably supported at its rear end on the axle 2, by means of a suitable bearing, and at its forward end by a bracket 10$^a$ which is rigidly secured to the adjacent side member of the main frame. A rockshaft 11 extends longitudinally of the supplemental frame 6 and is journaled in suitable bearings 12 supported on said supplemental frame by means of suitable brackets 13. This shaft may be operated in any suitable manner, but I prefer to operate the same from the traction wheels of the harvester, and, to this end, I provide the rear end of the shaft 11 with a crank arm 14 which is connected by means of a suitable connecting rod 15 with the wrist pin 16 of a crank wheel 17 which is rigidly secured to the rear end of a shaft 18. This shaft is journaled in the rear transverse member 19 of the supplemental frame 6 and extends forwardly beneath the shaft 8 and has its forward end journaled in a suitable bearing 20 carried by the transverse member 21 of said supplemental frame. The shaft 18 has mounted thereon a bevel pinion 22 adapted to mesh with a bevel gear 23 rigidly secured to the shaft 8. The longitudinal axis of the pinion 22 being inclined at an angle to the radius of the gear 23 owing to the depression of the forward end of the shaft 18, it is necessary to cut the teeth of the bevel gear 23 at such an angle to the radius of said gear that these teeth will be parallel with the teeth of the pinion 22 at their point of contact. The shaft 8 is rotated by means of a sprocket chain 24 extending about a sprocket wheel 25 mounted on the shaft 8 and a second sprocket wheel 26 mounted on the axle 2.

The forward ends of the side members of the supplemental frame 6 are connected by means of a transverse member 32 secured at its opposite sides to said side members and provided between the same with a suitable slide block 33 having in its inner face a guideway 34 adapted to engage a guide 35. This guide is preferably segmental in shape and is mounted on the bracket 10ª, which is rigidly secured to the side member of the main frame 1, thus forming a guide for the forward end of the supplemental frame during its vertical movement. The cutter is supported from the forward end of the supplemental frame 6 in any suitable manner and is adapted to be moved transversely of said frame and of the beet row to engage the beet tops and sever the same from the beets.

In the construction herein shown, the cutter comprises a thin blade 36, sharpened on its inner and forward edges, pivotally connected to the lower end of an arm or shank 37, the upper end of which is rigidly secured to a bracket 38 which, in turn, is rigidly secured to the forward end of the rockshaft 11 which projects beyond its forward bearing 12. The supporting bracket 38 is preferably in the form of an elongated block having a longitudinal groove formed in one face thereof and adapted to receive the upper end of the shank 37. The walls of this groove are flared outwardly toward the opposite ends thereof, thus providing a curved guideway 39 for the shank 37 and permitting the same to be rocked about a pivotal center formed at the point of engagement of the curved side walls of said groove with the sides of the shank, thus varying the angle at which the shank 37 extends from the shaft 11 and thereby adjusting the stroke of the cutter carried by said shank relatively to its support. The shank is held in its adjusted position in the bracket 38 by set screws 40. The bracket 38 has a socket or sleeve 41 formed on the rear side thereof and adapted to receive and to be rigidly secured to the projecting end of the rockshaft 11. A suitable guide is provided for the cutter 36 to support the same in proper relation to the beet row. This guide preferably consists of a shoe 42 having a guideway 43 adapted to receive the cutter 36. This shoe has its forward end bent upwardly, as shown at 44, and is supported from the supplemental frame in any suitable manner, preferably by means of arms or rods 45 and 46, which have their upper ends bent at an angle thereto, as shown at 47, and secured in transverse grooves 48 formed in the outer wall of the guide block 33. These rods are preferably adjustably connected to the shoe by means of bolts extending through a fixed portion of the shoe and through slots 49 formed in the lower ends of the rods. The rod 45 is also shown as adjustable longitudinally by forming the same in two sections and connecting these sections by means of one or more bolts 50 extending through slots 51 in said members. A suitable brace 55 extends between the rear end of the shoe 42 and the supplemental frame 6, thus holding this shoe against longitudinal movement. This shoe is also preferably provided with an upwardly extending shield 56 secured at its lower end to the inner side of the shoe, preferably by bolting the lower edge thereof to upwardly extending flanges or members 57 carried by said shoe and through which the guide or slot 43 for the cutter 36 is formed. Thus it will be seen that the cutter and its supporting mechanism are all carried by the supplemental frame 6 and are moved in a vertical plane when said supplemental frame is moved about its pivotal center. Suitable means are provided for so moving the supplemental frame, and, as here shown, this means consists of a bell crank lever 52 pivotally connected to the inner member 10 of the main frame and having one arm connected by a link 53 with the forward end of the frame 6 and its other end extended upwardly to form an operating handle 54. I also provide a suitable lifting device for engaging the foliage or beet tops and raising the same from the path of the shoe. This device preferably comprises a rod 58 bent downwardly and curved so that its rearmost portion extends in the rear of the forward edge of the shield 56 and its point extends in front of the shoe 42. Thus, when the rod is in its operative position, the point of the same will be moved beneath the beet tops and the same will be raised out of the path of the shoe, and, when released by the rod 58 will be engaged by the shield 56 and retained in their elevated position until the same have been severed by the cutter, when they drop to the ground and lie either upon the beet row or close thereto.

The operation of the device will be readily understood from the foregoing description of the several parts thereof. When the several parts of the apparatus are in their operative position, the shoe 42 will rest upon the ground at one side of the beet row and in this position will support the cutter 36 in such a manner that it will properly top the majority of the beets, as the most of these have their tops protruding but a short distance above the ground. As the machine moves along the beet row, the operator will, by means of the lever 54, raise the supplemental frame 6 and the shoe and cutter which are carried thereby to a proper height to top any beet which may protrude a greater distance than the height at which the cutter 36 is adjusted to operate normally. As soon as the cutter has passed this high beet, the lever 54 is released and the mechanism drops to its normal position immediately beyond this beet and in front of the next succeeding beet, thus bringing the cutter into the proper position to top this next beet, which may or may not be a low beet. Owing to the construction of the topping mechanism this downward movement of the cutter is permitted to take place very close to the high beet, the construction of the topping mechanism being such that the cutter blade is the only part of the mechanism that at any time extends above the beet row and the cutter is reciprocated toward and away from the beet row in such a manner that it is entirely withdrawn from above the row at rapidly recurring intervals, thus enabling the same to be moved to its lowermost position at any desired point.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. A machine of the character described comprising a main frame, a support mounted in engagement with the ground at one side of a beet row and vertically movable relatively to said main frame, and a cutter mounted on said support and adapted to engage the beets of said row.

2. A beet topper comprising a support mounted in engagement with the ground at one side of a beet row and movable in a vertical plane, a cutter mounted on said support and adapted to engage the beets of said row, and means for moving said cutter toward and away from said row.

3. A beet topper comprising a vertically movable guide supported in engagement with the ground at one side of a beet row, a cutter mounted in said guide, and means for actuating said cutter.

4. A beet topper comprising a shoe adapted to engage the ground at one side of a beet row and having a guideway therein, a cutter adapted to move in said guideway, and means for actuating said cutter.

5. A beet topper comprising a shoe adapted to engage the ground at one side of a beet row, a shield extending upwardly from the inner side of said shoe and having a slot therein near the upper surface of said shoe, a cutter adapted to move in said slot, and means for actuating said cutter.

6. A beet topper comprising a support mounted in engagement with the ground at one side of a beet row, a cutter mounted on said support and adapted to engage the beets of said row, and means for adjusting said support and said cutter vertically.

7. In an apparatus of the character described, the combination, with a main frame, of a supplemental frame adjustably mounted on a transverse and substantially horizontal axis, a guide carried by said supplemental frame, and a cutter mounted in said guide.

8. In an apparatus of the character described, the combination, with a main frame, of a supplemental frame adjustably mounted on said main frame, a cutter carried by said supplemental frame, and means supported from said supplemental frame and operatively connected to said cutter for reciprocating the same transversely to the beet row.

9. In an apparatus of the character described, the combination, with a main frame, of a supplemental frame adjustably mounted on said main frame, a guide carried by said supplemental frame, located at one side of the beet row and normally in engagement with the ground, and a cutter connected to said supplemental frame and adapted to reciprocate in said guide.

10. In an apparatus of the character described, the combination, with a main frame, of a supplemental frame adjustably mounted on said main frame, a shoe carried by said supplemental frame, adapted to engage the ground at one side of the beet row and having a guideway, and a cutter pivotally connected to said supplemental frame and adapted to reciprocate in said guideway.

11. In an apparatus of the character described, the combination, with a main frame, of a supplemental frame adjustably mounted on said main frame, a rockshaft supported from said supplemental frame, means for rocking said shaft, an arm rigidly secured to said shaft, and a cutter carried by said arm.

12. In an apparatus of the character described, the combination, with a main frame, of a supplemental frame adjustably mounted on said main frame, a rockshaft supported from said supplemental frame, means for rocking said shaft, an arm rigidly secured to said shaft, a cutter carried by said arm, and means for adjusting the stroke of said cutter.

13. In an apparatus of the character described, the combination, with a main frame, of a supplemental frame adjustably mounted on said main frame, a rockshaft supported from said supplemental frame, means for rocking the same, a bracket rigidly secured to said shaft and provided with a longitudinal groove having its opposite ends flared outwardly, an arm mounted in said groove, set screws extending through one side of said bracket into said groove near the opposite ends thereof and adapted to engage the adjacent side of said arm, and a cutter carried by said arm.

14. In an apparatus of the character described, the combination, with a main frame, of a supplemental frame arranged longitudinally to said main frame and movable about an axis extending transversely to said main frame, a cutter supported at one end of said supplemental frame, means supported by said supplemental frame and operatively connected to said cutter for actuating the same, and means for moving said supplemental frame about its transverse axis.

15. In an apparatus of the character described, the combination, with a main frame, a shaft journaled in said main frame, and means for rotating said shaft, of a supplemental frame pivotally mounted on said shaft, a rockshaft carried by said supplemental frame, means actuated by said rotatable shaft for rocking said rockshaft, an arm carried by the forward end of said rockshaft, a cutter mounted on said arm, and means for moving said supplemental frame about its pivotal center.

16. In an apparatus of the character described, the combination, with a main frame, and a segmental guide rigidly secured thereto, of a supplemental frame mounted on said main frame and movable about an axis extending transversely to said main frame, a guide plate carried by said supplemental frame and adapted to engage said guide, means for moving said supplemental frame about its transverse axis, a cutter carried by said supplemental frame, and means carried by said supplemental frame and connected to said cutter for actuating the same.

17. A beet topper comprising a support mounted at one side of a beet row and normally in engagement with the ground, a reciprocating cutter mounted on said support and adapted to engage the beets of said row, and hand-operated means for adjusting said support and said cutter at will.

18. In an apparatus of the character described, the combination, with a main frame, of a supplemental frame adjustably mounted on said main frame, a cutter carried by said supplemental frame, and means carried by said supplemental frame and operatively connected to said cutter for so actuating the same as to deliver the topping stroke on one side of the beet row.

In testimony whereof, I affix my signature in presence of two witnesses.

MOORE GOODFELLOW.

Witnesses:
EDWARD F. REED,
HARRIET L. HAMMAKER.